US012583008B2

(12) United States Patent
Annaka

(10) Patent No.: US 12,583,008 B2
(45) Date of Patent: Mar. 24, 2026

(54) HOLDING JIG, OPTICAL ELEMENT COATING METHOD, AND OPTICAL LENS MANUFACTURING METHOD

(71) Applicant: HOYA LENS THAILAND LTD., Pathumthani (TH)

(72) Inventor: Satoshi Annaka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 151 days.

(21) Appl. No.: 18/274,158

(22) PCT Filed: Feb. 14, 2022

(86) PCT No.: PCT/JP2022/005703
§ 371 (c)(1),
(2) Date: Jul. 25, 2023

(87) PCT Pub. No.: WO2022/196215
PCT Pub. Date: Sep. 22, 2022

(65) Prior Publication Data

US 2025/0025909 A1 Jan. 23, 2025

(30) Foreign Application Priority Data

Mar. 15, 2021 (JP) ................................ 2021-041230

(51) Int. Cl.
*G02B 7/02* (2021.01)
*B05C 3/10* (2006.01)
*B05C 13/02* (2006.01)

(52) U.S. Cl.
CPC ................ *B05C 13/02* (2013.01); *B05C 3/10* (2013.01)

(58) Field of Classification Search
CPC .................................. G02B 7/02; B05C 13/02
See application file for complete search history.

(56) References Cited

U.S. PATENT DOCUMENTS

2012/0114863 A1* 5/2012 Yajima ............... B29D 11/0023
427/372.2

FOREIGN PATENT DOCUMENTS

| | | | |
|---|---|---|---|
| EP | 2 386 900 B1 | | 8/2018 |
| JP | 2000-110435 A | | 4/2000 |
| JP | 2006-092653 A | | 4/2006 |
| JP | 2011081173 A | * | 4/2011 |

(Continued)

OTHER PUBLICATIONS

Jan. 14, 2025 extended Search Report issued in European Patent Application No. 22770974.8.

(Continued)

*Primary Examiner* — Cachet I Proctor
(74) *Attorney, Agent, or Firm* — Oliff PLC

(57) ABSTRACT

A holding jig which is capable of holding any of optical elements of various shapes or sizes, and free of causing deformation or damage of the optical elements. A holding jig for holding an optical element includes: a base; first, second and third holding parts which hold the periphery of a lens substrate; a first arm to which the first holding part is attached and which is provided to the base swingably about a pivot; a torsion spring biasing the first arm in a first swinging direction such that the first holding part is urged toward the lens substrate; and an arm locking mechanism configured to lock the swinging of the first arm.

11 Claims, 6 Drawing Sheets

(56) References Cited

FOREIGN PATENT DOCUMENTS

| | | | | |
|---|---|---|---|---|
| JP | 2012030137 | A | * | 2/2012 |
| JP | 2012-242832 | A | | 12/2012 |

OTHER PUBLICATIONS

Apr. 5, 2022 International Search Report issued in International Patent Application No. PCT/JP2022/005703.

Apr. 5, 2022 Written Opinion issued in International Patent Application No. PCT/JP2022/005703.

* cited by examiner

HOLDING JIG, OPTICAL ELEMENT COATING METHOD, AND OPTICAL LENS MANUFACTURING METHOD

TECHNICAL FIELD

The present disclosure discloses a holding jig, an optical element coating method, and an optical lens manufacturing method.

BACKGROUND ART

As a method of forming a film, such as a hard coat film or an antireflection film, on a lens substrate of a spectacle lens, a method has been widely used which comprises immersing the lens substrate in a film-forming coating liquid, and drying the coating liquid coated on the surface of the lens substrate, thereby forming a film. In such a step of immersion in the coating liquid, the lens substrate is immersed in the coating liquid in a state in which the periphery of the lens substrate is held by a lens holder. Then, after pulling up the lens substrate from the coating liquid, the lens substrate is subjected to heating treatment, while being held by the lens holder, thereby drying the coating liquid, or annealing a coating film.

As one example of a lens holder for holding a lens substrate, the following Patent Document 1 discloses a lens holding unit comprising: a lower holding member which is in contact with the periphery of a lens substrate from below the lens substrate; a lateral swingable holding member configured to be swingable such that it comes into contact with the periphery of the lens substrate from one of horizontally opposite sides of the lens substrate; and a lateral stationary holding member which is in contact with the periphery of the lens substrate from the other of the horizontally opposite sides of the lens substrate. Further, in the lens holding unit described in the Patent Document 1, the lateral swingable holding member is pushed toward a lens substrate by a leaf spring. Thus, even when plural types of lens substrates of different sizes or shapes are selectively held by the lens holding unit (lens holder), the lateral swingable holding member can be brought into contact with the periphery of each of the lens substrates.

CITATION LIST

Patent Document

Parent Document 1: JP-A1 2012-242832

SUMMARY OF INVENTION

Technical Problem

Here, the configuration for biasing the swingable holding member by a spring such as a leaf spring, as described in Reference 1, has an advantage of being able to hold each of plural types of lens substrates of different sizes or shapes, without replacing one lens holder with another lens holder in each case. However, a pushing force applied to the periphery of a lens substrate varies depending on the size or shape of the lens substrate. Thus, when it is attempted to stably hold a lens substrate of any size or shape, a pressing forth of about 5N will be applied to the periphery of the lens substrate in some cases. This is because when holding a lens substrate having a relatively large diameter, the leaf spring is contracted much more, and thus a force applied from the lateral swingable holding member to the lens substrate becomes larger.

On the other hand, it is advantageous in terms of production efficiency to, subsequently to the immersion coating, subject the lens substrate to heating treatment, while holding the lens substrate by the holder, thereby curing a coating agent or annealing a coating film. Thus, if the heating treatment is performed in a situation where a lens substrate having a relatively large diameter or having a relatively small thickness is held by the lens holder, deformation or damage is likely to occur in the lens substrate.

The present disclosure has been made in view of the above problem, and an object thereof is to provide a holding jig which is capable of holding any of optical elements of various shapes or sizes, and free of causing deformation or damage of the optical elements.

Solution to Technical Problem

According to a first aspect of the present disclosure, there is provided a holding jig for holding an optical element, comprising: a base; at least three holding parts which hold a periphery of the optical element; a first arm to which a first holding part among the at least three holding parts is attached and which is provided to the base swingably about a pivot; a biasing member biasing the first arm in a first swinging direction such that the first holding part is urged toward the optical element; and a locking mechanism configured to lock the swinging of the first arm.

According to a second aspect of the present disclosure, there is provided a holding jig for holding an optical element, comprising: at least three holding parts each of which holds a periphery of a circular or elliptical optical element; a biasing member biasing a first holding part among the at least three holding parts toward an edge of the optical element being held; and a locking mechanism configured to lock the first holding part at a position where the first holding part is in contact with the edge of the optical element being held, and substantially eliminate a biasing force of the biasing member.

According to a third aspect of the present disclosure, there is provided a method of forming a film on a surface of an optical element, using the holding jig according to the first aspect of the present disclosure. The method comprises the steps of: in a state in which the first arm of the holding jig is urged and opened, placing the optical element such that it is surrounded by the at least three holding parts; releasing the urging to the first arm to allow the first holding part to be brought into contact with the periphery of the optical element by the biasing member; locking the first arm by the locking mechanism; immersing, in a coating liquid, the optical element held by the holding jib; pulling up the optical element from the coating liquid; and thermally curing the coating liquid coated on the optical element.

According to a fourth aspect of the present disclosure, there is provided a method of forming a film on a surface of a circular or elliptical optical element, using a holding jig, wherein the holding jig comprises: at least three holding parts each of which holds a periphery of the optical element; and a biasing member biasing a first holding part among the at least three holding parts toward an edge of the optical element being held. The method comprises the steps of: holding the optical element by bringing each of the at least three holding parts into contact with a periphery of the optical element; in a state in which the first holding part is in contact with the edge of the optical element, locking the first holding part to substantially eliminate a biasing force of the biasing member; immersing, in a coating liquid, the optical element held by the holding jib; pulling up the optical element from the coating liquid; and thermally curing the coating liquid coated on the optical element.

According to a fifth aspect of the present disclosure, there is provided a method of manufacturing an optical lens, comprising the step of forming a film on a lens substrate by the method according to the third or fourth aspect of the present disclosure.

Effect of Invention

The present invention can provide a holding jig which is capable of holding any of optical elements of various shapes or sizes, and free of causing deformation or damage of the optical elements.

DESCRIPTION OF EMBODIMENTS

With reference to the drawings, a lens holding jig according to one embodiment of the present disclosure will now be described in detail.

The lens holding jig 1 according to this embodiment is designed to hold an optical element, when a functional film is formed on the surface of the optical element through a coating processing, by immersing the optical element in a processing liquid as described below. Examples of the optical element include a lens substrate used for spectacle lenses.

Figure 1:
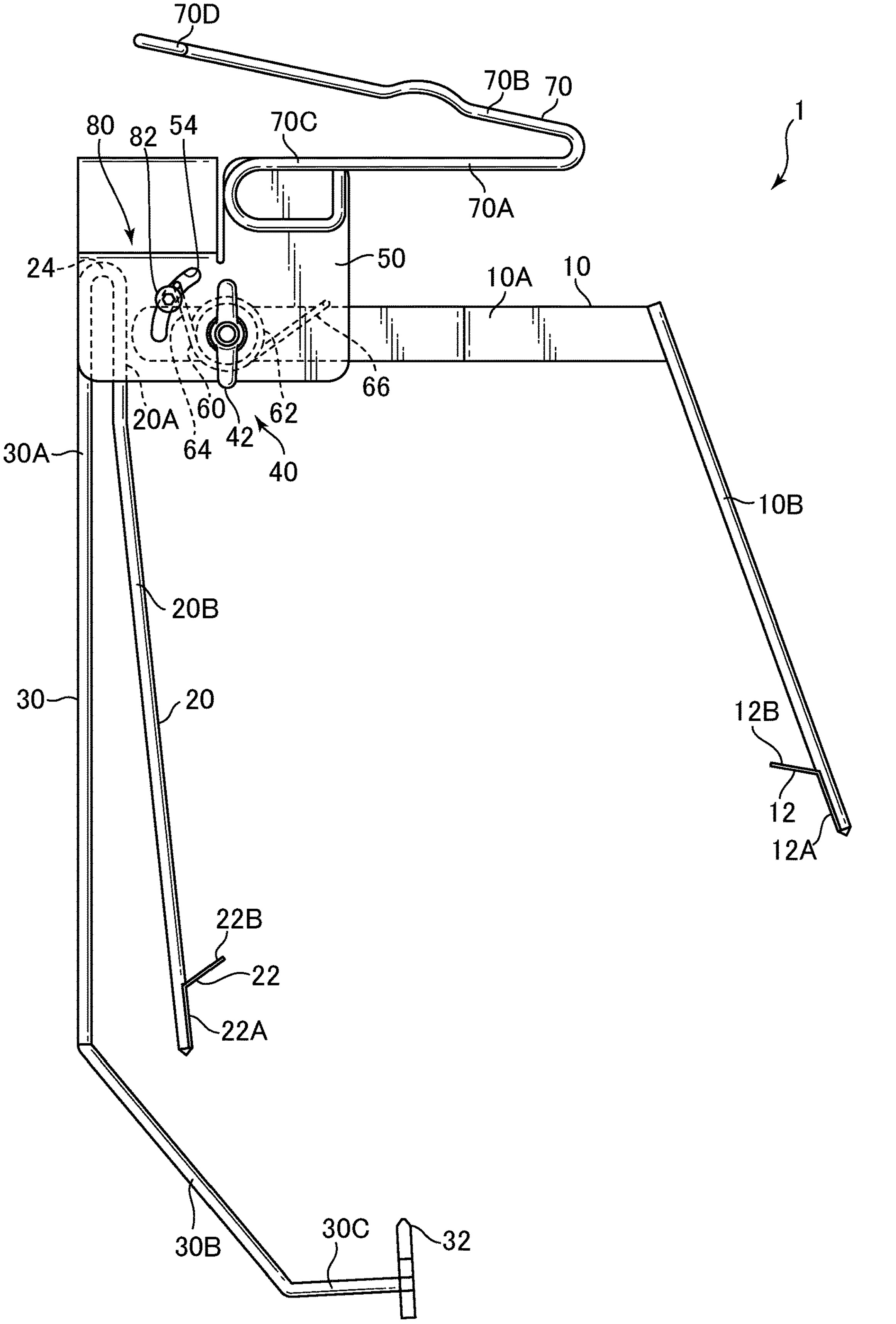
FIG. 1 is a front view showing a lens holding jig according to one embodiment of the present disclosure.
Figure 2:
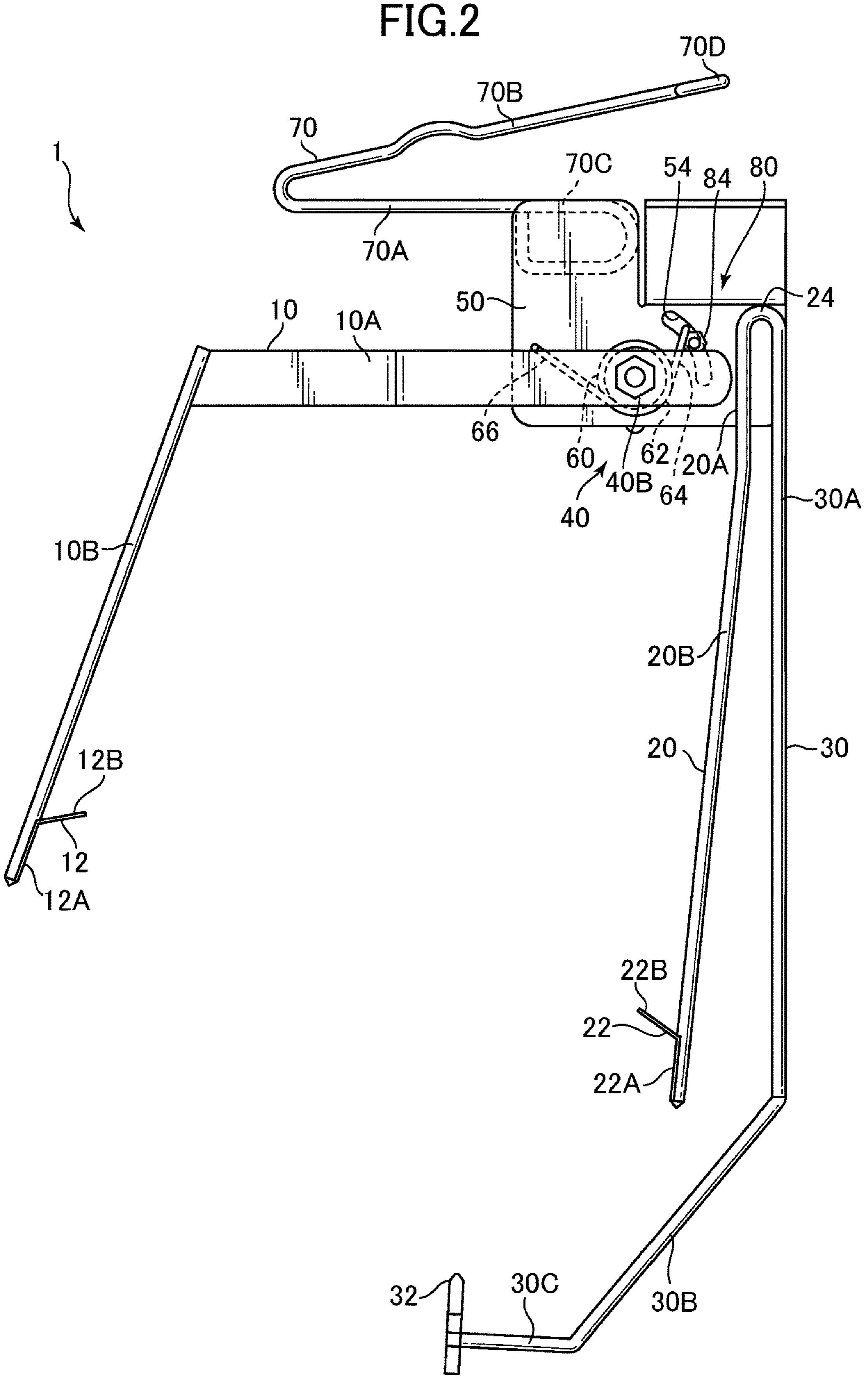
FIG. 2 is a rear view showing the lens holding jig according to the one embodiment of the present disclosure.
Figure 3:
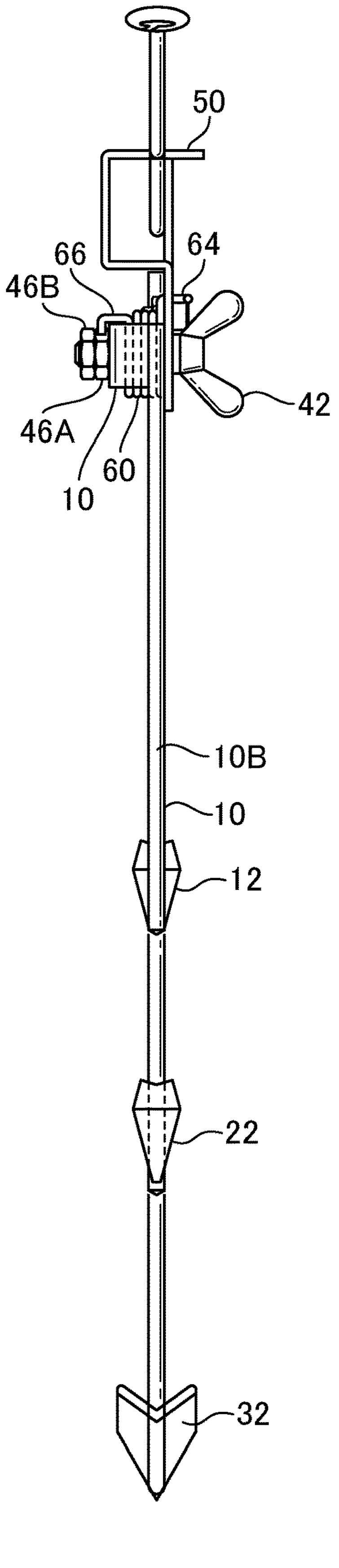
FIG. 3 is a side view showing the lens holding jig according to the one embodiment of the present disclosure.
Figure 4:
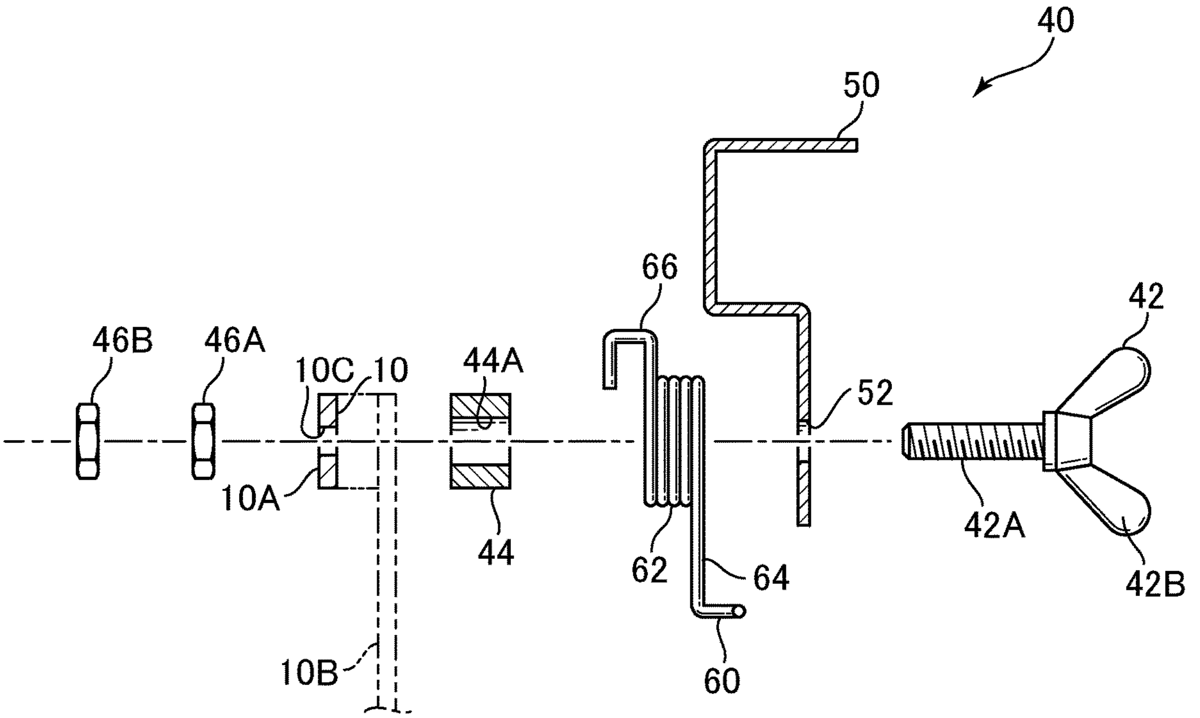
FIG. 4 is an exploded side view of the arm locking mechanism of the lens holding jig illustrated in FIG. 1.

FIGS. 1 to 3 show the lens holding jig according to the one embodiment of the present disclosure, wherein FIG. 1, FIG. 2 and FIG. 3 are, respectively, a front view, a rear view, and a side view. Further, FIG. 4 is an exploded side view of a locking mechanism (hereinafter referred to also as "arm locking mechanism") of the lens holding jig illustrated in FIG. 1. As shown in FIGS. 1 to 4, the lens holding jig 1 according to this embodiment comprises a base 50, a first arm 10, a second arm 20, a third arm 30, an arm locking mechanism 40, a hanging member 70, a torsion spring 60, and a spring locking mechanism 80. Each of the members constituting the lens holding jig 1 is made of a heat-resistant metal such as stainless steel, unless otherwise specified.

The base 50 is composed of a plate-like member which defines a plane perpendicular to a horizontal plane (which extends parallel to the surface of the drawing sheet) in a hung state, and has an approximately rectangular shape in front view.

The base 50 is formed with a through-hole 52 (FIG. 4) penetrating through between the front and rear surfaces thereof, and an arc slot 54 extending in a circular arc shape around the through-hole 52. The through-hole 52 has a circular shape with a diameter which allows a threaded portion 42A of the after-mentioned butterfly bolt 42 of the arm locking mechanism 40 to be inserted thereinto. The arc slot 54 is formed to extend over a given angular range, in an area lying obliquely upwardly in a direction opposite to a direction along which the first arm 10 extends (the right direction in FIG. 1), with respect to the through-hole 52.

The hanging member 70 is connected to an upper part of the base 50. The hanging member 70 is composed of a rod-shaped member bent into an approximately V shape. The hanging member 70 comprises: a lateral portion 70A having one end attached to the base 50 and extending laterally; and an inclined portion 70B bent into a V shape with respect to the lateral portion 70A to extend obliquely upwardly with respect to the base 50. A base end of the lateral portion 70A is formed as an annular looped portion 70C which is welded and connected to one surface of the base 50. An end of the inclined portion 70B is formed as an attaching portion 70D formed in an annular shape. When immersing a lens substrate in a coating liquid, the lens holding jig 1 holding the lens substrate is used in a hung state which can be achieved by attaching the attaching portion 70D to a device capable of up-down driving.

The first arm 10 comprises a base end portion 10A extending laterally, and a distal end portion 10B extending obliquely downwardly from a distal end of the base end portion 10A. The base end portion 10A is composed of a plate which is flat in up-down and right-left directions (parallel to the surface of the drawing sheet of FIG. 1), and one end thereof on the side of the base 50 is formed with a circular through-hole 10C (FIG. 4) having a diameter which allows the threaded portion 42A of the after-mentioned butterfly bolt 42 to be inserted thereinto. The distal end portion 10B is composed of a straight rod-shaped member, and a base end thereof is connected to the distal end the base end portion 10A. A distal end of the distal end portion 10B is provided with a first holding part 12 for holding a lens substrate. The first holding part 12 comprises: a base end potion 12A attached to the distal end portion 10B of the first arm 10 such that it is along the surface of the distal end portion 10B; and a distal end portion 12B bent toward a lens substrate holding space with respect to the base end portion 12A. A distal edge of the distal end portion 12B to be brought into contact with a lens substrate is formed in a V-shaped concave shape.

The second arm 20 is composed of a rod-shaped member, and comprises a base end portion 20A attached to the base 50, and a distal end portion 20B extending downwardly from the base end potion 20A. In the second arm 20, an upper end of the base end portion 20A is welded and connected to the base 50. The distal end portion 20B is inclined toward to the lens substrate holding space with respect to the base end portion 20A. A distal end of the distal end portion 20B is provided with a second holding part 22 for holding a lens substrate. The second holding part 22 comprises: a base end portion 22A attached to the distal end portion 20B of the second arm 20 such that it is along the surface of the distal end portion 20B; and a distal end portion 22B bent toward the lens substrate holding space with respect to the base end portion 22A. As shown in FIG. 3, a distal edge of the distal end portion 22 B to be brought into contact with a lens substrate is formed in a V-shaped concave shape.

The third arm 30 is composed of a rod-shaped member, and comprises: a base end portion 30A attached to the base 50 and extending downwardly; an intermediate portion 30B extending obliquely downwardly from the base end portion 30A toward the first arm 10; and a distal end portion 30C extending laterally from the intermediate portion 30B. In the third arm 30, an upper end of the base end portion 30A is welded and connected to the base 50. A distal end of the distal end portion 30C is provided with a third holding part 32 for holding a lens substrate. The third holding part 32 is attached approximately perpendicularly to the surface of the distal end portion 30C. A distal edge of the third holding part 32 to be brought into contact with a lens substrate is formed in a V-shaped concave shape.

In this embodiment, the base end portion 20A of the second arm 20 and the base end portion 30A of the third arm 30 are connected together through a curved portion 24. However, the present invention is not limited thereto, but the second arm 20 and the third arm 30 may be formed as separate members.

As shown in FIG. 4, the arm locking mechanism 40 comprises a butterfly bolt 42 as a threaded member, a pivot member 44, and a pair of nuts 46A, 46B. The butterfly bolt 42 comprises: a cylindrical-shaped threaded portion 42A whose outer peripheral surface is formed with a thread; and a pair of manual operation wings 42B connected to the thread portion 42A.

The pivot member 44 is composed of a cylindrical-shaped resin member made of plastic or the like. As a material of the pivot member 44, it is preferable to use a material whose frictional resistance with the first arm 10 is increased when it is pressed against the first arm 10. The pivot member 44 is formed with a through-hole 44A. The pivot member 44 has an outer diameter slightly smaller than the inner diameter of the torsion spring 60.

The arm locking mechanism 40 is constructed by inserting the threaded portion 42A of the butterfly bolt 42 from the side of a front surface of the base 50 in order of the through-hole 52 of the base 50, the torsion spring 60, the through-hole 44A of the pivot member 44, and the through-hole 10C of the first arm 10, and then tightening the pair of nuts 46A and 46B onto a distal end of the threaded portion 42A from the side of a rear surface of the base 50. In this configuration, when the tightening of the butterfly bolt 42 is weak, the first arm 10 is rotatable with respect to the base 50 about the threaded portion 42A of the butterfly bolt 42. Then, by tightening the butterfly bolt 42 into the pair of nuts 46A and 46B, the pivot member 44 is pressed against the surfaces of the base 50 and the first arm 10. Thus, a frictional force between the first arm 10 and the pivot member 44 and a frictional force between the base 50 and the pivot member 44 are increased, so that it becomes possible to restrict swinging of the first arm 10 with respect to the base 50, and lock the first arm 10 to the base 50.

In this embodiment, the thread formed on the threaded section 42A of the butterfly bolt 42 is a right-hand thread. That is, a turning direction along which for the butterfly bolt 42 is tightened is the same as the swinging direction along which the first arm 10 is biased by the torsion spring 60. Thus, even when the butterfly bolt 42 is tightened in a state in which the first holding part 12 is in contact with the periphery of a lens substrate L, it becomes possible to prevent a situation where the first arm 10 is swung to cause the first holding part 12 to separate away from the lens substrate L.

The spring locking mechanism 80 comprises: a bolt 82 inserted into the arc slot 54 of the base 50 from the side of the front surface of the base 50; and a nut 84 tightened onto the bolt 82 from the side of the rear surface of the base 50. In the spring locking mechanism 80, the friction among the bolt 82, the nut 84 and the base 50 can be increased by tightening the nut 84 and the bolt 82, so that it becomes possible to lock the position of the bolt 82 and the nut 84. On the other hand, the bolt 82 and the nut 84 can be moved along the arc slot 53 by loosening the tightening of the nut 84 and the bolt 82.

The torsion spring 60 comprises: a spiral portion 62 formed spirally; and a first arm portion 64 and a second arm portion 66 each extending from a corresponding one of opposite ends of the spiral portion 62. The torsion spring 60 is mounted around the pivot member 44 by inserting the pivot member 44 in the inside of the spiral portion 62. A distal end of the first arm portion 64 is bent in a direction away from the spiral portion 62, and a distal end of the second arm portion 66 is bent in a direction away from the spiral portion 62

The distal end of the first arm portion 64 of the torsion spring 60 is hooked to the upper side of the spring locking mechanism 80 in the arc slot 54, and the distal end of the second arm portion 66 is hooked to an upper edge of the first arm 10. The torsion spring 60 is mounted in a state in which twist is preliminarily applied between the first arm portion 64 and the second arm portion 66. Thus, the torsion spring 60 receives a reaction force from the spring locking mechanism 80, and biases the first arm 10 such that the first holding part 12 is swung toward the second arm 20.

Figure 5:
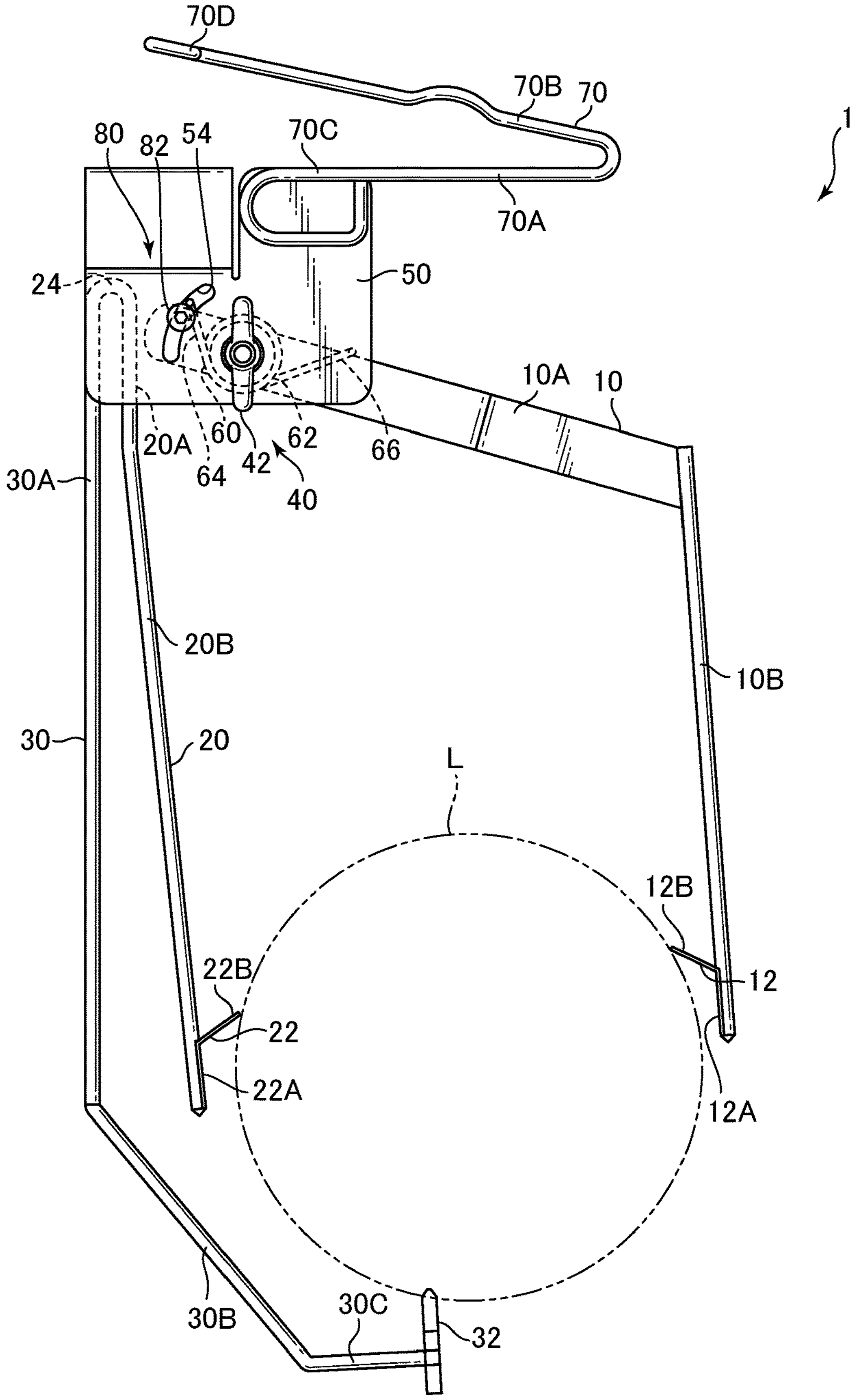
FIG. 5 is a front view showing a state in which a lens substrate is held by the holding jig according to the one embodiment of the present disclosure.

FIG. 5 is a front view showing a state in which a lens substrate is held by the holding jig according to the one embodiment of the present disclosure. In an operation of holding a lens substrate by the holding jig, first of all, the first arm 10 is pulled laterally, such that it is swung away from the second arm 20. In this state, the lens substrate L is placed among the first holding part 12, the second holding part 22 and the third holding part 32, and then the pulling of the first arm 10 is released.

Thus, the first holding part 12, the second holding part 22, and the third holding part 32 are brought into contact with the periphery of the lens substrate L, individually, so that the lens substrate L is held at three points, as shown in FIG. 5. Subsequently, the butterfly bolt 42 of the arm locking mechanism 40 is tightened. Thus, the first arm 10 is locked to the base 50, and the lens substrate L is held, in a state in which the first holding part 12, the second holding part 22, and the third holding part 32 are in contact with the periphery of the lens substrate L, and substantially no biasing force is applied to the lens substrate L.

Here, the position at which each of the first holding part 12 and the second holding part 22 holds the lens substrate L is preferably set such that a distance from the center of gravity of the lens substrate L in a height direction is equal to or less than 0.3 times the diameter of the lens substrate L (or the length of the major axis when the lens substrate L has an elliptical shape). Further, the position at which the third holding part 32 holds the lens substrate L is preferably set such that a distance from the center of gravity of the lens substrate L in a horizontal direction is equal to or less than 0.15 times the diameter or the length of the major axis R of the lens substrate L in the horizontal direction. By setting the holding position of the lens substrate L in the above manner, it becomes possible to stably hold the lens substrate L. Further, it becomes possible to suppress unevenness of film thickness which would otherwise be caused by a phenomenon that when pulling up the lens substrate L from the coating liquid in the after-mentioned step, surplus coating liquid remaining in the lens holding parts flows across an optical surface of the lens substrate L by gravity.

The biasing force of the torsion spring 60 to the first arm 10 can be adjusted by moving the position of the spring locking mechanism 80 along the arc slot 54. Specifically, the biasing force can be reduced by loosening the tightening of the bolt 82 and the nut 84, and after moving the bolt 82 and the nut 84 downwardly along the arc slot 54, retightening the bolt 82 and the nut 84. The position of the spring locking mechanism 80 is preferably adjusted such that a force by which the first holding part 12 presses the lens substrate during positioning of the lens substrate becomes about 0.1 to 1 N, depending on to the size and shape of the lens substrate. If the pressing force is excessively large, a large force is required for positioning of the lens substrate, and if it is excessively small, the stability of the positioning operation is reduced. In either case, there is a negative impact on operability.

The above description had been made with reference to FIG. 5 showing an example where the lens substrate has a circular shape. However, the present invention is not limited thereto, but any other odd-shaped lens substrate (lens substrates of other shapes such as an elliptical shape) can also be held by the holding jig 1. When holding a lens substrate other than a circular lens substrate, it is desirable that a major axis direction (direction in which the lens substrate has the largest dimension) extends vertically. The advantageous effect of the present invention can be significantly obtained in a plus prescription lens having a relatively small edge thickness because the periphery thereof to be held and its vicinity are more likely to undergo deformation or damage.

The following description will be made about a method of forming a film on a lens substrate and a method for manufacturing a spectacle lens, using the above holding jig.

A spectacle lens to be manufactured may be any of various types of lenses, such as a single focus lens, a multifocal lens, and a progressive power lens. The type of lens is determined by surface shapes of both surfaces of a lens substrate. The surface of the lens substrate may be any of a convex surface, a concave surface, and a planar surface. In a commonly-used lens substrate and spectacle lens, an object-side surface is a convex surface, and an eyeball-side surface is a concave surface. However, the present invention is not limited thereto.

The lens substrate is preferably a plastic lens substrate. Examples of a resin used for the plastic lens substrate may include: a styrene resin including a (meth) acrylic resin; a polycarbonate resin; an allyl resin; an allyl carbonate resin such as a diethylene glycol bisallyl carbonate resin (CR-39); a vinyl resin; a polyester resin; a polyether resin; a urethane resin obtained by a reaction between an isocyanate compound, and a hydroxy compound such as diethylene glycol; a thiourethane resin obtained by reacting an isocyanate compound with a polythiol compound; and a cured product (generally referred to as "transparent resin") obtained by curing a curable composition containing a (thio) epoxy compound having one or more disulfide bonds in the molecule.

The lens substrate may have a refractive index of, e.g., about 1.48 to 1.75

Figure 6:
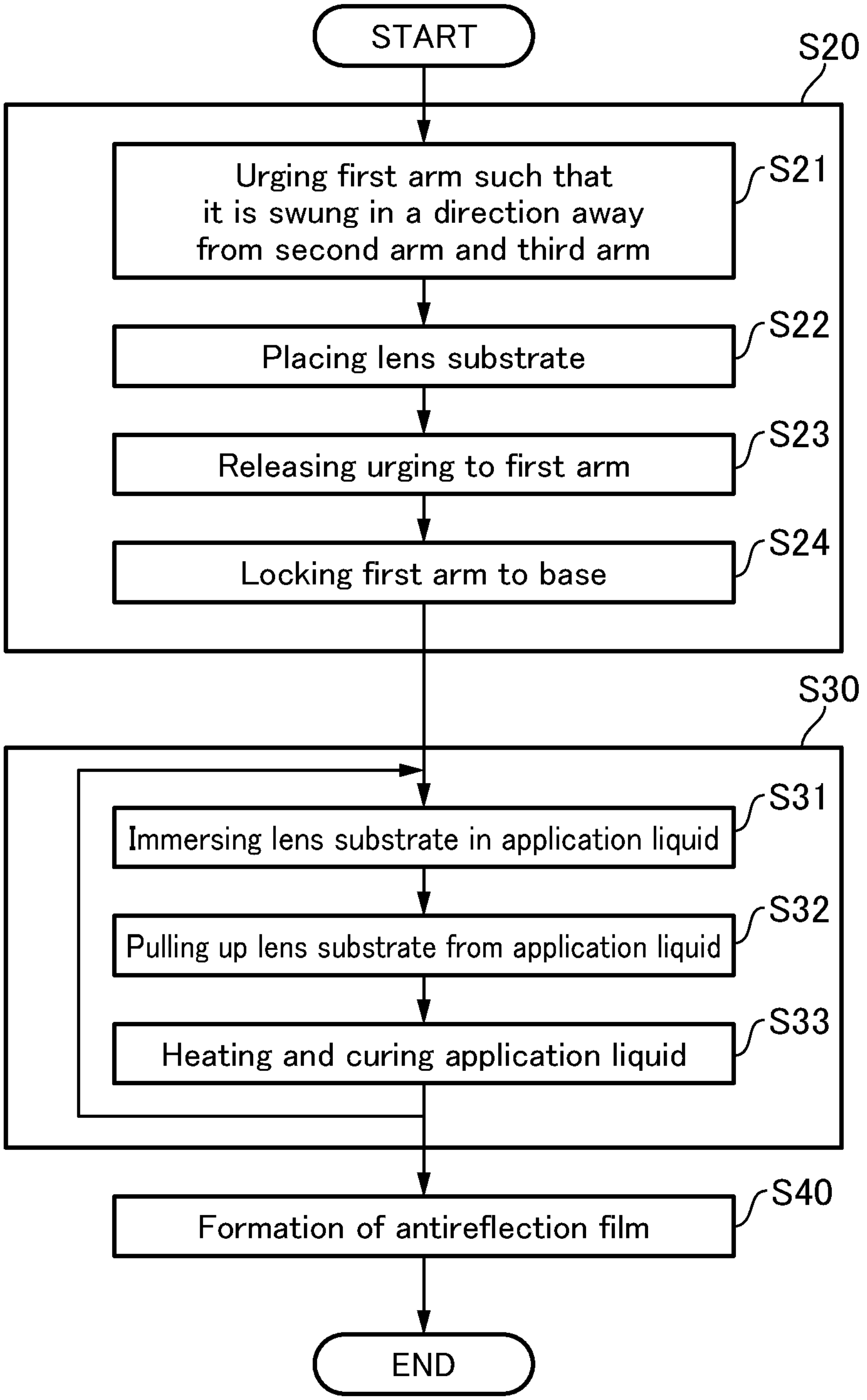
FIG. 6 is a flowchart showing an optical lens manufacturing method according to one embodiment of the present disclosure.

FIG. 6 is a flowchart exemplifying an optical lens manufacturing method according to one embodiment of the present disclosure. The following description will be made by taking formation of a hard coat film onto a lens substrate L as an example.

In order to allow a lens substrate serving as a material of an optical lens for spectacles to have a shape corresponding to a prescription for a user, a semifinished lend is subjected to cutting, polishing, and cleaning. A lens substrate to which the present invention is applied may be a semifinished lens. Alternatively, it may be a lens substrate having eyeball-side and object-side optical surfaces formed based on a prescription for a user.

First of all, as shown in FIG. 6, the lens substrate L is attached to the holding jig (S20). The attachment of the lens substrate L to the holding jig 1 is performed in the following manner.

The first arm 10 is first pulled such that it is swung in a direction away from the second arm 20 and the third arm 30 to open up a space among the first holding part 12, the second holding part 22 and the third holding part 32 (S21).

Then, in a state in which the first arm 10 is spaced away from the second arm 20 and the third arm 30, the lens substrate L is placed such that it is surrounded by the first holding part 12, the second holding part 22 and the third holding part 32 (S22). When the first arm 10 is biased toward an edge of the lens substrate L being held, the first arm is pulled as described above to swing the first arm in a direction away from the second arm and the third arm, against the biasing force.

Then, the pulling to the first arm 10 is released. Thus, according to the biasing force of the torsion spring 60, the first arm 10 is swung in a direction along which it approaches the second arm 20 and the third arm 30, and the first holding part 12 presses the lens substrate L to allow the first holding part 12, the second holding part 22, and the third holding part 32 to be kept in contact with the periphery of the lens substrate L (S23).

Then, the butterfly bolt 42 of the arm locking mechanism 40 is tightened into the pair of nuts 46A, 46B. Thus, the first arm 10 is locked to the base 50 (S24). Through the steps S 21 to S 24, the lens substrate L can be held by the holding jig 1. In this state, the lens substrate L is stably held so that an optical surface thereof extends approximately vertically, and substantially no biasing force is applied to the periphery of the lens substrate L from the torsion spring 60. That is, at a position where the first to third holding parts are in contact with the edge of the optical element being held, the first holding part is locked to substantially eliminate the biasing force which has pressed the lens substrate L.

Subsequently, a hard coat film is formed on the lens substrate (S30). The formation of the hard coat film on the lens substrate L is performed in the follow manner.

The holding jig 1 is first moved downwardly to immerse the lens substrate L in a coating liquid consisting primarily of a silicone compound forming the hard coat film (S31).

Then, the holding jig 1 is moved upwardly to pull up the lens substrate L from the coating liquid (S32). By pulling up the lens substrate L from the coating liquid in this manner, excess coating liquid is removed from the optical surface of the lens substrate L by gravity.

Then, the holding jig 1 is subjected to heating treatment at 80 to 120° C. By subjecting the holding jig 1 to heating treatment, the coating liquid coated on the surface of the lens substrate L is thermally cured (S33). In this process, substantially no external force (biasing force for holding the lens) is applied to the lens substrate L. Thus, the holding jig 1 according to this embodiment can prevent deformation or damage of the lens substrate L.

Then, the immersion into the coating liquid (S31), the pulling-up from the coating liquid (S32) and the thermal curing (S33) are will repeated until a hard coat film having a given thickness is formed on the optical surface of the lens substrate L. That is, by repeating the steps S31 to S33, a desired hard coat film can be formed. It is to be understood that the steps S 31-S 33 may be repeated on an as-needed basis to form a hard coat film having a given thickness.

In advance of the process of forming the hard coat film on the lens substrate (S30), a primer layer may be formed on the surface of the lens substrate. The primer layer is intended to ensure the shock resistance of the lens substrate, and ensure adhesion between the hard coat film and the lens substrate. When the lens substrate is made of a material having relatively high refractive index, the primer layer may be made of a material which does not exert any influence on optical properties. A method of forming such a primer layer may comprise: coating a primer by dipping, spin coating, spraying or the like; and then curing the primer by heating, photoradiation, or the like.

Subsequently, an antireflection film is formed on the surface of the hard coat film (S40). The antireflection film can be formed by, e.g., vacuum deposition, dipping or spin coating.

Through the above steps, a spectacle lens can be manufactured.

According to this embodiment, the following effects are produced.

In this embodiment, the first holding part 12 is attached to the first arm 10 swingably provided to the base. Thus, the first arm 10 can be swung to hold any of various types of lens substrates having different sizes and shaped. Further, after the lens substrate is placed in a given position by the first to third holding parts, the swinging of the first arm 10 is locked by tightening the butterfly bolt 42 and the nuts 46 A and 46 B, which constitute the arm locking mechanism 40, so that the lens substrate L is stably held in a state in which no external force is applied thereto. Therefore, it is possible to prevent the lens substrate L from being deformed or damaged by an external force, even when the lens substrate L is subjected to heating treatment such as thermal curing of a coating film material.

In this embodiment, the position of the spring locking mechanism 80 for locking the first arm portion 64 of the torsion spring 60 can be shifted along the arc slot 54. Thus, even when holding various types of lens substrates L having different sizes and shapes, the position of the spring locking mechanism 80 can be changed to adjust the biasing force to be applied to the first arm from the torsion spring 60, thereby preventing deformation or damage of the lens substrate L.

In this present embodiment, the arm locking mechanism 40 is configured to lock the swinging of the first arm 10 by tightening the butterfly bolt 42 into the nuts 46A, 46B to clamp the first arm 10 between the butterfly bolt 42 and the nuts 46 A, 46 B through the pivot member 44. This allows an operator who performs film-formation processing for the lens substrate L to perform locking of the first arm and release of the locking easily without taking time.

In this embodiment, the turning direction for tightening the butterfly bolt 42 is the same as the direction along which the first arm 10 is biased by the torsion spring 60. This makes it possible to prevent a situation where when tightening the butterfly bolt 42, the first arm 10 is swung to cause the first holding part 12 to separate away from the periphery of the lens substrate L.

This embodiment has been described based on an example where a hard coat film is formed on the surface of the lens substrate L. However, the present invention is not limited thereto, the lens substrate L may be formed with, e.g. a blue-light blocking film for blocking light of a blue light region (wavelength band of 380 to 500 nm) to reduce glare and improve visibility and contrast, an antireflection film containing, e.g., silicon oxide, titanium dioxide, zirconium oxide or tantalum oxide, or a water repellent film using an organosilicon compound having a fluorine atom to improve water repellency. The lens holding jig 1 according to this embodiment can also prevent deformation or damage of the lens substrate L even when the lens substrate L is subjected to annealing.

This embodiment is configured such that the lens substrate L is held by the first holding part 12, the second holding part 22, and the third holding part 32. Alternatively, the lens substrate may be held by four or more holding parts. In this embodiment, the second holding part 22 and the third holding part 32 are fixed. Alternatively, they may also be configured to be movable.

In this embodiment, the second holding part 22 and the third holding part 32 are attached to the second arm 20 and the third arm 30, respectively. This makes it possible to flexibly hold the second holding part 22 and/or the third holding part 32 to reduce a force applied to the lens substrate L.

In this embodiment, the butterfly bolt 42 is used for the arm locking mechanism 40. Alternatively, a thumb bolt or a knob bolt may be used. It is preferable to apply a mechanism capable of allowing an operator to perform tightening and releasing easily and efficiently without using any additional jig.

LIST OF REFERENCE SIGNS

1: lens holding jig
10: first arm
10A: base end portion
10B: distal end portion
10C: through-hole
12: first holding part
12A: base end potion
12B: distal end portion
20: second arm
20A: base end potion
20B: distal end portion
22: second holding part
22A: base end portion
22B: distal end portion
24: curved portion
30: third arm
30A: base end portion
30B: intermediate portion
30C: distal end portion
32: third holding part
40: arm locking mechanism
42: butterfly bolt
42A: threaded portion
42B: manual operation wing
44: pivot member
44A: through-hole
46A: nut
46B: nut
50: base
52: through-hole
54: arc slot
60: torsion spring
62: spiral portion
64: first arm portion
66: second arm portion
70: hanging member
70A: lateral portion
70B: inclined portion
70C: looped portion 70D: attaching portion
80: spring locking mechanism
82: bolt
84: nut

The invention claimed is:

1. A holding jig for holding an optical element, comprising:

a base;

at least three holding parts which hold a periphery of the optical element;

a first arm to which a first holding part among the at least three holding parts is attached and which is provided to the base swingably about a pivot;

a biasing member biasing the first arm in a first swinging direction such that the first holding part is urged toward the optical element; and a locking mechanism configured to lock the swinging of the first arm and substantially eliminate a biasing force of the biasing member, wherein each of a first holding part and a second holding part among the at least three holding parts holds the optical element at a position where a distance from a center of gravity of the optical element in a height direction is equal to or less than 0.3 times a diameter of the optical element or a length of a major axis when the optical element has an elliptical shape, and a third holding part holds the optical element at a position where a distance from a center of gravity of the optical element in a horizontal direction is equal to or less than 0.15 times the diameter or the length of the major axis of the optical element in the horizontal direction.

2. The holding jig according to claim 1, wherein the biasing member is composed of a torsion spring installed between the base and the first arm to exert a biasing force, wherein a fixed position of the torsion spring to the base is changeable in a direction of a circumference about the pivot.

3. The holding jig according to claim 1, wherein the locking mechanism comprises a threaded member, and a nut threadingly engaged with the threaded member, wherein the locking mechanism is configured to lock the swinging of the first arm by tightening the threaded member and the nut to clamp the first arm therebetween.

4. The holding jig according to claim 3, wherein a turning direction of the threaded member for the tightening is a same as the first swinging direction.

5. The holding jig according to claim 1, wherein the number of the at least three holding parts is three, wherein a second holding part and a third holding part among the three holding parts are attached, respectively, to a second arm and a third arm each fixed to the base.

6. A holding jig for holding an optical element, comprising:

at least three holding parts each of which holds a periphery of a circular or elliptical optical element;

a biasing member biasing a first holding part among the at least three holding parts toward an edge of the optical element being held; and a locking mechanism configured to lock the first holding part at a position where the first holding part is in contact with the edge of the optical element being held, and substantially eliminate a biasing force of the biasing member, wherein each of a first holding part and a second holding part among the at least three holding parts holds the optical element at a position where a distance from a center of gravity of the optical element in a height direction is equal to or less than 0.3 times a diameter of the optical element or a length of a major axis when the optical element has an elliptical shape, and a third holding part holds the optical element at a position where a distance from a center of gravity of the optical element in a horizontal direction is equal to or less than 0.15 times the diameter or the length of the major axis of the optical element in the horizontal direction.

7. A method of forming a film on a surface of an optical element, using the holding jig according to claim 1, the method comprising the steps of:

in a state in which the first arm of the holding jig is urged and opened, placing the optical element such that it is surrounded by the at least three holding parts, that each of a first holding part and a second holding part among the at least three holding parts holds the optical element at a position where a distance from a center of gravity of the optical element in a height direction is equal to or less than 0.3 times a diameter of the optical element or a length of a major axis when the optical element has an elliptical shape, and that a third holding part holds the optical element at a position where a distance from a center of gravity of the optical element in a horizontal direction is equal to or less than 0.15 times the diameter or the length of the major axis of the optical element in the horizontal direction;

releasing the urging to the first arm to allow the first holding part to be brought into contact with the periphery of the optical element by the biasing member;

locking the first arm by the locking mechanism and substantially eliminating a biasing force of the biasing member;

immersing, in a coating liquid, the optical element held by the holding jig;

pulling up the optical element from the coating liquid; and thermally curing the coating liquid coated on the optical element.

8. A method of forming a film on a surface of a circular or elliptical optical element, using a holding jig, wherein the holding jig comprises: at least three holding parts each of which holds a periphery of the optical element; and a biasing member biasing a first holding part among the at least three holding parts toward an edge of the optical element being held, the method comprising the steps of:

holding the optical element by bringing each of the at least three holding parts into contact with a periphery of the optical element, such that each of a first holding part and a second holding part among the at least three holding parts holds the optical element at a position where a distance from a center of gravity of the optical element in a height direction is equal to or less than 0.3 times a diameter of the optical element or a length of a major axis when the optical element has an elliptical shape, and that a third holding part holds the optical element at a position where a distance from a center of gravity of the optical element in a horizontal direction is equal to or less than 0.15 times the diameter or the length of the major axis of the optical element in the horizontal direction;

in a state in which the first holding part is in contact with the edge of the optical element, locking the first holding part to substantially eliminate a biasing force of the biasing member;

immersing, in a coating liquid, the optical element held by the holding jig;

pulling up the optical element from the coating liquid; and thermally curing the coating liquid coated on the optical element.

9. The method according to claim 8, wherein the step of holding includes bringing the at least three holding parts into contact with the periphery of the optical element, against the biasing force.

10. A method of manufacturing an optical lens, comprising the step of forming a film on a lens substrate by the method according to claim 9.

11. A method of manufacturing an optical lens, comprising the step of forming a film on a lens substrate by the method according to claim 7.

* * * * *